US 6,619,645 B1

(12) United States Patent
Rottler et al.

(10) Patent No.: US 6,619,645 B1
(45) Date of Patent: Sep. 16, 2003

(54) FIXTURING SYSTEM FOR HOLDING AND ALIGNING ENGINE BLOCKS DURING REBUILDING

(75) Inventors: Andrew Craig Rottler, Seattle, WA (US); Donald Brooks Rottler, Seattle, WA (US)

(73) Assignee: Rottler Manufacturing Inc., Kent, WA (US)

( * ) Notice: Subject to any disclaimer, the term of this patent is extended or adjusted under 35 U.S.C. 154(b) by 0 days.

(21) Appl. No.: 09/995,958

(22) Filed: Nov. 28, 2001

Related U.S. Application Data
(60) Provisional application No. 60/253,556, filed on Nov. 28, 2000.

(51) Int. Cl.[7] .................................................. B23Q 3/00
(52) U.S. Cl. .................. 269/296; 269/289 R; 29/281.1
(58) Field of Search ......................... 269/17, 289 R, 269/296, 287; 254/133 R, 134, 8 B; 29/281.1

(56) References Cited

U.S. PATENT DOCUMENTS

| | | | |
|---|---|---|---|
| 1,363,020 A | * | 12/1920 | Shewalter .................. 269/17 |
| 1,600,835 A | * | 9/1926 | Manley ...................... 269/17 |
| 1,812,585 A | * | 6/1931 | Collins ...................... 269/17 |
| 3,830,488 A | * | 8/1974 | Wilger et al. ............... 269/17 |
| 4,239,196 A | * | 12/1980 | Hanger ...................... 269/17 |
| RE31,859 E | * | 4/1985 | Aldridge, Jr. .............. 408/54 |

* cited by examiner

Primary Examiner—Lee D. Wilson
(74) Attorney, Agent, or Firm—Christensen O'Connor Johnson Kindness PLLC

(57) ABSTRACT

A fixturing system is provided for rigidly clamping an engine block while precisely orienting the engine block for accurate machining of selected engine surfaces during rebuilding process. The fixturing system is designed to be mounted on a working table to machine and/or inspect a variety of block surfaces. The fixturing system comprises a head stock assembly, tail stock assembly, a support member, and an indexing member. The engine block is placed between the head stock assembly and the tail stock assembly. The support member is inserted through the main bearing crankshaft bore and connects with the head stock assembly and the tail stock assembly to align and rigidly clamp the engine block to the tool table. The engine block may then be rotated to an indexed position by inserting the indexing cam bar through the cam bore and into locating slots in the head stock assembly.

38 Claims, 10 Drawing Sheets

FIXTURING SYSTEM FOR HOLDING AND ALIGNING ENGINE BLOCKS DURING REBUILDING

CROSS-REFERENCE TO RELATED APPLICATION

This application claims the benefit of U.S. Provisional Patent Application Ser. No. 60/253,556, filed on Nov. 28, 2000, which is hereby incorporated by reference.

FIELD OF THE INVENTION

The present invention relates to fixtures for holding a workpiece securely to a working table, and more particularly to a fixture for holding and aligning an engine block to a working table during rebuilding.

BACKGROUND OF THE INVENTION

Engine rebuilding has become a popular alternative to purchasing new engines in such fields as automobiles and watercraft. In some high performance industries, such as professional racing, teams build and rebuild their engines before every racing event. To the average consumer and the racing professional alike, accurate machining and rebuilding is a necessity for good performance and reliability in an engine.

Certain engine blocks, such as V-blocks, include a number of cylindrical bores on each side of the block that extend into a block at a common angle inclined from the vertical axis. For a given block, the central axes of the bores of one side will intersect with the central axes of the bores of the other side to form an angle, referred to herein as the "V angle." The V angle will represent twice the value of the inclination of each bank of cylinders from the vertical axis.

One common type of machine used for rebuilding an engine is a reboring machine. Reboring the cylinders of an engine block employs a boring tool that is rotatably mounted on a vertically disposed shaft. The boring tool is lowered along a vertical pathway into a cylinder to rebore the cylinder. It is thus necessary for proper reboring that the cylinder be properly aligned under the boring tool and oriented such that its central axis is vertical.

Boring machines designed for use with engine blocks having a plurality of cylinders aligned in a row, referred to hereinafter as a "bank" of cylinders, commonly mount the engine block on a movable-working table. Such an arrangement enables the block to be moved such that each cylinder bore in a bank can be rebored while the block is fixtured in a single position on the working table. Translation of the working table is normally restricted to a straight-line pathway so that if the first cylinder in a bank is properly aligned with the machine and fixtured in place, the remaining cylinders will also be properly aligned.

In order to properly align a V-block so that an entire bank of cylinders can be rebored from a single fixtured position, it is necessary to incline the block so that the cylindrical bores are in a vertical position. The block must then be vertically and horizontally aligned or "indexed" with respect to the working table so that the boring tool can be lowered into each cylinder with its central axis positioned substantially in the same position as the central axis of the cylinder.

One known method of aligning and fixturing a V-block is to mount the block on a mounting fixture. A conventional mounting fixture comprises of two spaced-apart support members positioned on a working table to hold an engine block therebetween. Each support member includes two downwardly sloping walls that extend from the top of the support member to a conversion or intersection point located on the axis of symmetry to form V-shaped support members. The support members are spaced apart a necessary distance to receive an engine block therebetween. The downwardly sloping walls are each inclined from the vertical axis of the mounting fixture at an angle that is equal to half the V-angle of the block.

The mounting fixture also includes an alignment bar that is adjustably positioned parallel to and spaced apart from the working table to align the engine block between the mounting surface and the alignment bar. The alignment bar is inserted through the main bearing bore of the engine block and supported at the intersection point of each support member to properly align the engine block in the longitudinal direction of the working table. The mounting fixture further includes a second alignment bar that is routed through the camshaft bore of the engine block. The engine block is then rotated until the second alignment bar comes into contact with a block mounted to one of the downwardly sloping walls. Once the engine block is placed on the working table, and properly aligned using the first and second alignment bars, the engine block is secured in place by conventional clamps that extend from the working table to the top of the vertically disposed cylinder bank.

Although existing mounting fixtures provide a means for fixturing V-blocks, several disadvantages remain with existing models. One disadvantage in the prior art is that since neither of the alignment bars are secured to the mounting fixture, a lack of clamping force is provided against the engine block to inhibit movement and vibration of the engine block. For example, small movements and vibration in the engine block can occur due to the rotational cutting force transmitted by the reboring machine. Even small movement and vibration can cause variations in the machining since the dimensional changes in normal machining such as honing and reboring is approximately 0.001". Vibration reduces the precision with which the boring tool can be positioned within the cylinder bore during the reboring process. As boring tool positioning precision drops, errors in cylinder bore dimensions and inner bore surface problems, such as pitting, increase. As a result, cylinder walls become asymmetrical during the reboring process. Asymmetrical cylinder walls are, of course, unacceptable in environments where high quality rebuilding is required or desired. Another disadvantage of the conventional mounting fixtures is that the conventional mounting fixture only permits a few surfaces (e.g. cylinder bores and cylinder bank faces) to be machined, while not accounting for different engine blocks, such as inline engine blocks and overhead cam engine blocks.

Therefore, there is a need for a fixturing system that inhibits small movement and vibration during the rebuilding process, while further providing a more flexible fixturing system that can be used with V-blocks, inline cylinder engine blocks, and overhead cam engine blocks.

SUMMARY OF THE INVENTION

A fixturing system is provided for holding an engine block during the rebuilding process. The fixturing system rigidly clamps the engine block to inhibit movement and vibration while precisely orienting the engine block for accurate machining of selected engine surfaces. The fixturing system is designed to be mounted on a working table, such as a precision T-slotted tool table, beneath a selected refinishing machine.

In accordance with an aspect of the present invention, a fixturing system is provided for affixing an engine block having rebuildable surfaces to a working table. The fixturing system includes a first clamping member adapted to be fixedly mounted to a working table. The first clamping member has a clamping surface substantially orthogonal to the top surface of the working table for clamping a first surface of an engine block. A second clamping member adapted to be fixedly mounted to a working table a remote distance from the first clamping member is also provided. The second clamping member has a clamping surface substantially orthogonal to the top surface of the working table for clamping a second surface of the engine block. The fixturing system further includes a support member operable to align the engine block parallel to the longitudinal axis of the working table. The support member is fixedly connected to the first and second clamping members to eliminate relative movement between the fixturing system and the engine block when the engine block is clamped therebetween.

In one embodiment of the present invention, the fixturing system further includes an indexing member operably associated with the first and second clamping member for indexing the engine block between the first and second clamping members such that a pre-selected rebuildable surface of the engine is properly aligned with a rebuilding machine associated with the working table.

In accordance with another aspect of the present invention, a fixturing system is provided for affixing an engine block having rebuildable surfaces to a working table. The fixturing system includes a first clamping member adapted to be slideably mounted to a working table along a longitudinal path of travel of the working table. The first clamping member is selectively positionable in an unsecured position, wherein the first clamping member is operable to translate along the longitudinal path of travel, and selectively positionable in a secured position, wherein the first clamping member is fixedly secured at a desired position along the longitudinal path of travel. The first clamping member has a first clamping surface substantially orthogonal to the top surface of the working table. A second clamping member adapted to be slideably mounted to a working table along a longitudinal path of travel of the working table a remote distance from the first clamping member is also provided. The second clamping member is selectively positionable in an unsecured position, wherein the second clamping member is operable to translate along the longitudinal path of travel, and selectively positionable in a secured position, wherein the second clamping member is fixedly secured at a desired position along the longitudinal path of travel. The second clamping member has a second clamping surface substantially orthogonal to the top surface of the working table. The fixturing system further includes a support member operable to align the engine block parallel to the longitudinal axis of the working table. The support member is fixedly connected to the first and second clamping members to eliminate relative movement between the fixturing system and the engine block when the engine block is clamped therebetween.

In accordance with yet another aspect of the present invention, a fixturing system is provided for affixing an engine block having rebuildable surfaces to a working table. The fixturing system includes a first clamping member adapted to be fixedly mounted to a working table. The first clamping member has a first surface substantially orthogonal to the top surface of the working table. A second clamping member is provided, which is adapted to be fixedly mounted to a working table a remote distance from the first clamping member. The fixturing system also includes a truing member having spaced-apart notches. The alignment member is secured to the first surface of the first clamping member such that the notches are orthogonal to the top surface of the working table. An alignment bar adapted to be engaged by the main bearing grooves of the engine block is further provided. The alignment bar is operable to engage the alignment notches such that the alignment bar is orthogonal to the top surface of the working table. The fixturing system further includes an elongate rod selectively secured to the second clamping member. One end of the elongate rod is adapted to engage against the engine block to clamp the engine block between the first clamping member and the end of the elongate rod.

In accordance with still another aspect of the present invention, a method of fixturing an engine block having rebuildable surfaces to a working table is provided. The working table is operably coupled to a rebuilding machine. The method includes securing a first clamping member to the working table. The first clamping member has a first clamping surface. A second clamping member having a second clamping surface is positioned on the working table a spaced-apart distance from the first clamping member. The spaced apart-distance is capable of receiving an engine block therebetween. An engine block is then positioned between the first and second clamping surfaces of the first and second clamping member. The engine block is aligned between the first and second clamping members with a support member and the ends of the support member are fixedly secured to the first and second clamping members. The engine block is then clamped between the first and second clamping surfaces.

In one embodiment, before the engine block is clamped, the engine block is indexed with an indexing member so that a pre-selected engine surface is vertically aligned with the rebuilding machine.

In accordance with still yet another aspect of the present invention, a method of fixturing an engine block having rebuildable surfaces to a working table is provided. The working table is operably coupled to a rebuilding machine. The method includes securing a first clamping member to the working table. The first clamping member has a first surface. A truing member is secured to the first surface of the first clamping member in a removable fashion. The truing member has vertically aligned spaced-apart notches. A second clamping member is positioned to the working table a spaced-apart distance from the first clamping member. The spaced apart-distance is capable of receiving an engine block therebetween. An engine block is positioned between the first and second clamping members such that the longitudinal axis of the engine block is orthogonal to the top surface of the working table. The engine block is aligned between the first and second clamping members with an alignment bar. The alignment bar is positioned between the spaced-apart notches of the truing member and the main bearing grooves of the engine block. The engine block is then clamped between the first and second clamping members.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
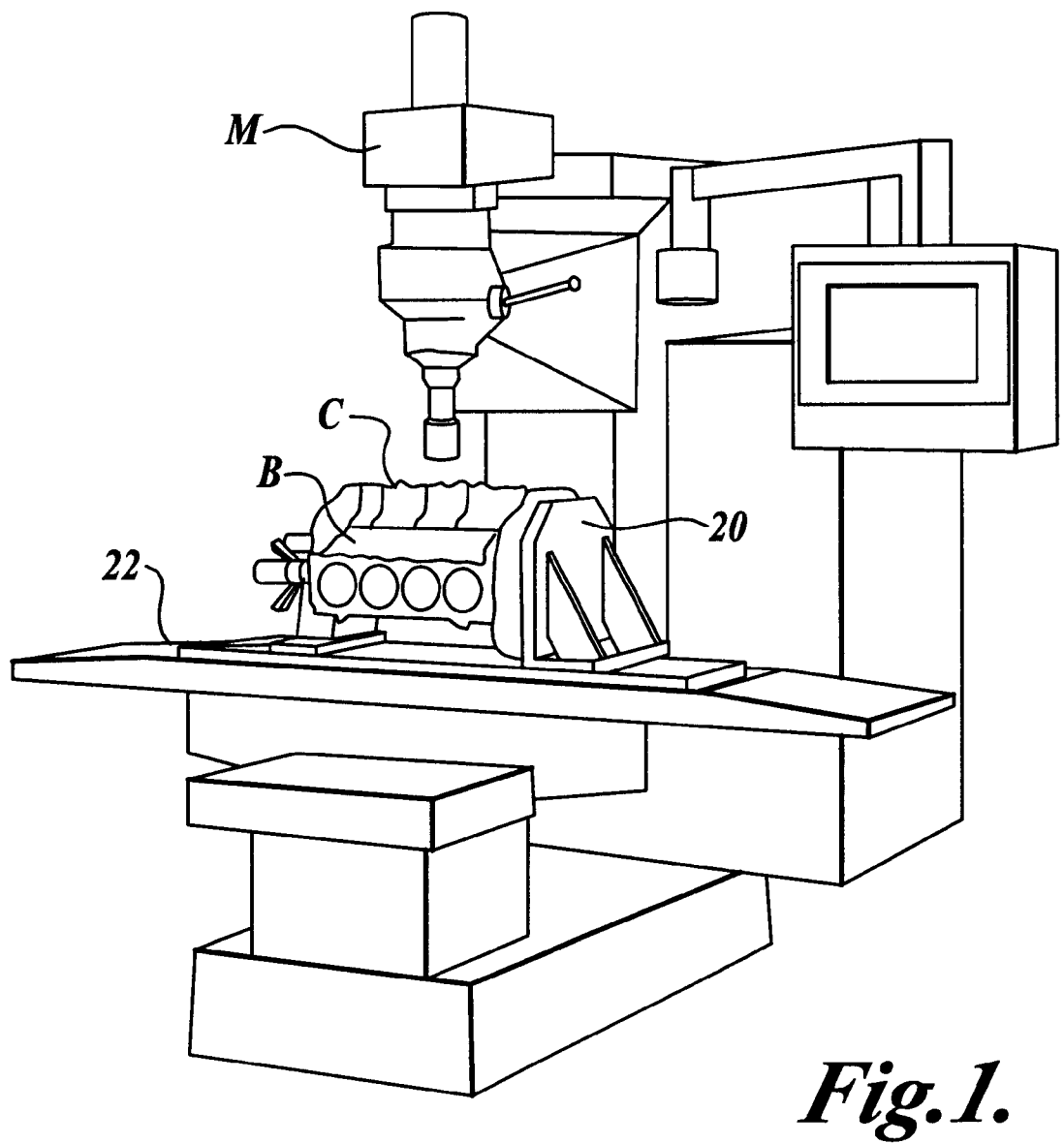
FIG. 1 illustrates an engine block fixtured beneath a refinishing machine by an exemplary embodiment of a fixturing system in accordance with aspects of the present invention.

FIG. 1 illustrates an engine block B fixtured beneath a refinishing machine M, such as a boring machine, with a first bank of cylinders C aligned with respect to the boring machine M by an exemplary embodiment of a fixturing system 20 in accordance with the present invention. Referring to FIGS. 1–10, the fixturing system 20 is mounted on a working table, such as a T-slotted machine tool table 22, that is associated with the refinishing machine M. The fixturing system 20 rigidly clamps the engine block B to the T-slotted machine tool table 22 in the properly aligned and "indexed" position so that a pre-selected engine surface, such as the cylinder bores, may be refinished with precision. Additionally, the fixturing system 20 may be configured to align and index the engine block B in other orientations to precisely refinish other key engine surfaces, such as the transmission flange, manifold support surfaces, crankshaft bore surfaces, associated threaded and location apertures and the like, depending on which engine surface is selected by the user to refinish. The following descriptions relating to various engine configurations is meant to be illustrative and not limiting to the broadest scope of the inventions, as claimed. For clarity, when the detailed description refers to rebuilding, refinishing, and machining, these terms should be appreciated by those skilled in the art to include, but not limited to, inspection, resurfacing, honing, boring, drilling, tapping, reaming, and milling, to name a few.

Figure 2:
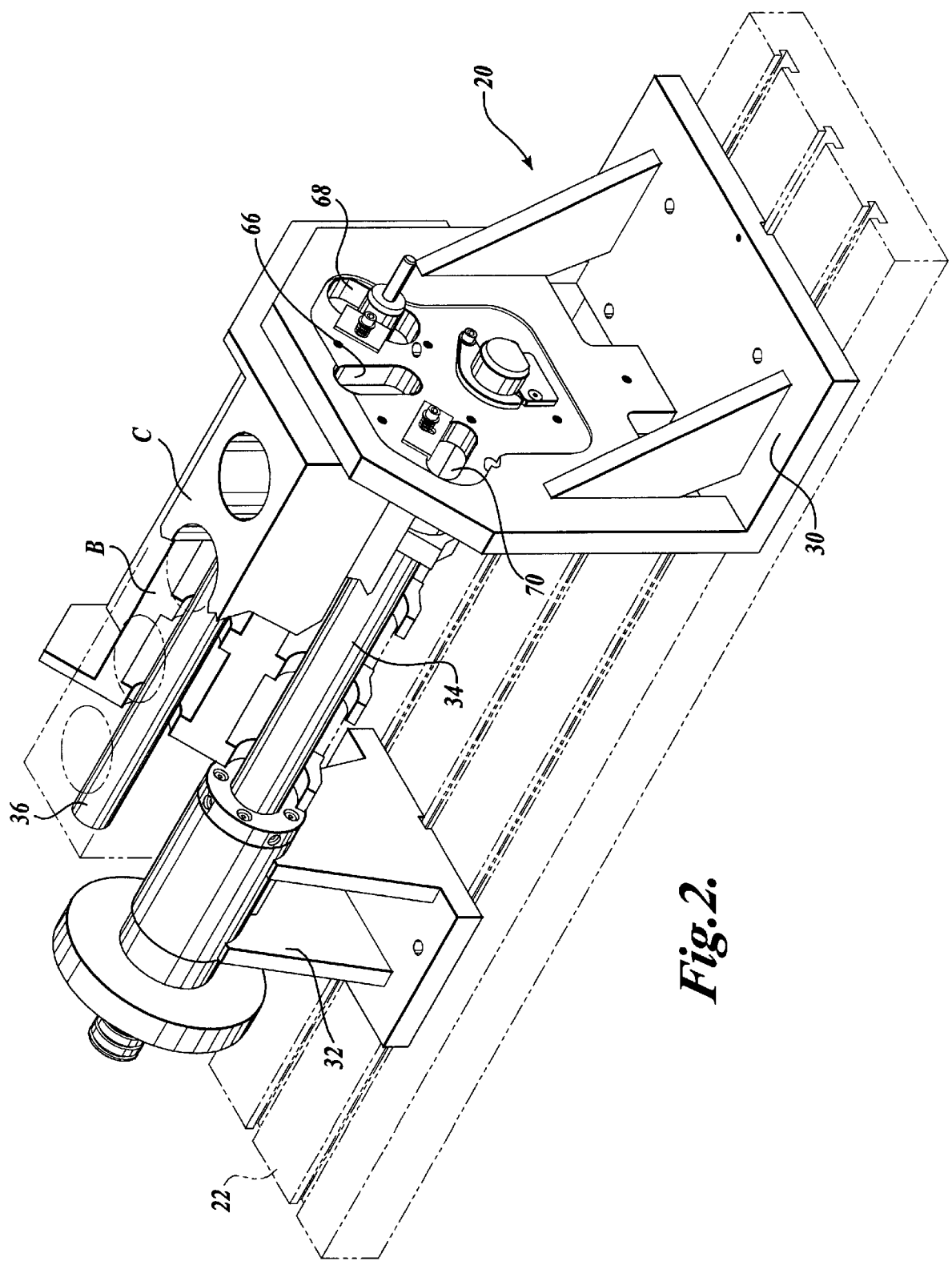
FIG. 2 illustrates the exemplary fixturing system aligning and securing an engine block to a working tool table.

Referring now to FIG. 2, the fixturing system 20 comprises a first clamping member or head stock assembly 30, a second clamping member or a tail stock assembly 32, a support member 34, and an indexing member 36, which together rigidly clamps the engine block B to the tool table 22 during machining. The engine block B is placed between the head stock assembly 30 and the tail stock assembly 32. The support member 34 is utilized to align the engine block B along the longitudinal axis of the working table 22. In the embodiment shown in FIG. 2, the support member 34 is a main bearing bar, which is routed through the main bearing crankshaft bore of the engine block B and is connected at properly located bores in the respective head stock and tail stock assemblies 30 and 32. The engine block B may then be rotated about the axis of the support member 34 with the use of the indexing member 36 to an angle that properly aligns or "indexes" the cylinder banks C with the refinishing machine. In the embodiment shown in FIG. 2, the proper rotation angle is determined by indexing or location slots 66, 68, and 70 in the head stock assembly 30 that receive the indexing member 36 after it passes through the cam bearing bore of the engine block. The fixturing system 20 rigidly clamps the engine block for vibration-free machining.

Figure 3:
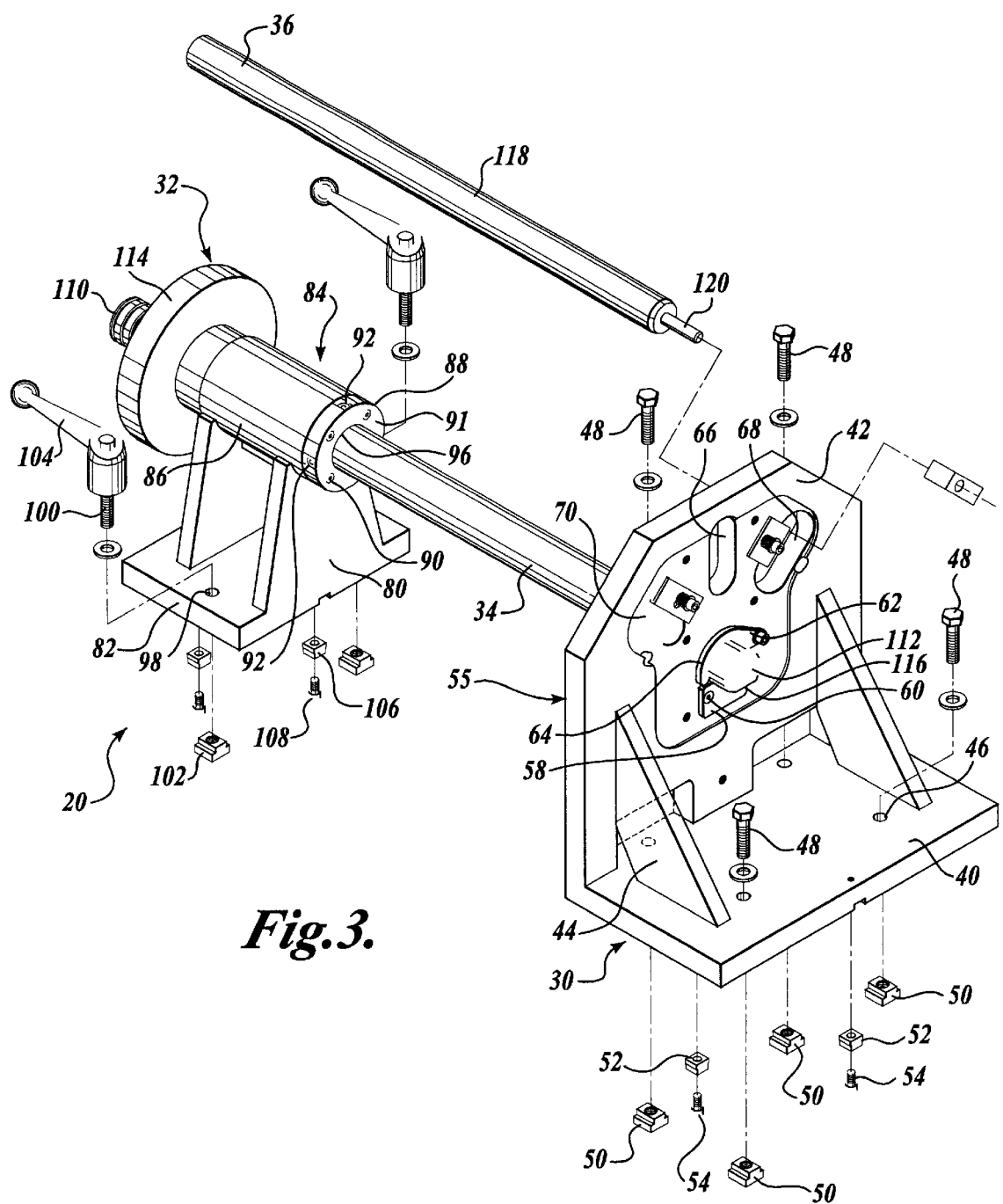
FIG. 3 illustrates an exploded view of the exemplary fixturing system shown in FIG. 2.

Referring now to FIG. 3, the head stock assembly 30 of the fixturing system 20 is adapted to clamp one end of engine block against the tail stock assembly 32. The head stock assembly 30 includes a base plate 40 secured to a mounting plate 42 at a right angle to form a L-shaped member. A pair of spaced-apart inclined members 44 may be secured between the base plate 40 and the mounting plate 42 to provide strength and rigidity to the head stock assembly 30. The base plate 40 includes a plurality of spaced-apart apertures 46 for removably mounting the head stock assembly 30 to the tool table 22 (FIG. 2). To removably mount the head stock assembly 30 to the tool table 22, four threaded fasteners, such as bolts 48, are passed through the apertures 46 and are received by four corresponding threaded T-nuts 50 at the bottom of the base plate 40. The T-nuts 50 are located such that they travel within the T-slots disposed in the tool table 22 when the head stock assembly 30 is positioned on the tool table 22. The base plate 40 further includes two spaced-apart guide keys 52 secured to the bottom thereof by fasteners, such as screws 54. The guide keys 52 are also properly position on the bottom surface of the base plate 40 so that they may slide through the T-slots located in the tool table 22. By utilizing the T-nuts and guide keys, the head stock assembly 30 is capable of sliding to a desirable position on the tool table 22 and then secured to the tool table 22 by the bolts 48 and the T-nuts 50.

As best shown in FIG. 3, the mounting plate 42 of the head stock assembly 30 has a first clamping surface 55 (the inner surface of the mounting plate 42 which faces the tail stock assembly 32) and includes a bore 56 (FIG. 7) suitably located for receiving an end of support member 34. Positioned at the bottom of the bore 56 is a rectangular shaped support plate 58. The support plate 58 is secured to the mounting plate 42 by fasteners, such as screws 60. The support plate 58 partially covers the bottom of the bore 56 to create a bore having a flat bottom. The benefits of this feature will be described below with reference to the support member 34. A securement member 62 is pivotally connected to the mounting plate 42 adjacent to the bore 56. The securement member 62 has a C-shaped end 64 adapted to mate with an annular slot (not shown) in the support member 34. The curvature of the end directly corresponds to the curvature of the annular slot in the support member 34. The securement member 62 rigidly secures the support member 34 to the head stock assembly 30.

Still referring to FIG. 3, the mounting plate 42 further includes three space-apart indexing slots 66, 68, and 70 suitably positioned for receiving the indexing member 36. The first indexing slot 66 is disposed above the bore 56 (FIG. 7) and lies along a common vertical axis that separates the head stock assembly 30 into two equal sections. The first indexing slot 66 is provided to index a V-block so that the top of the engine block can be machined and/or inspected. The second and third indexing slots 68 and 70 are disposed to the right and left of the first indexing slot 66 when looking at the end view of the head stock assembly 30. The second and third indexing slots 68 and 70 are at an acute angle with respect to the vertical axis of the mounting plate 42. The angle is equal to the angle to which the cylinder banks are inclined from the vertical axis of the engine block. The second and third indexing slots 68 and 70 are provided to index a V-block engine so that either bank of cylinders may be oriented in a vertical position so that the cylinder bores can be refinished by boring, surfacing or honing machines, to name a few.

Figure 4:
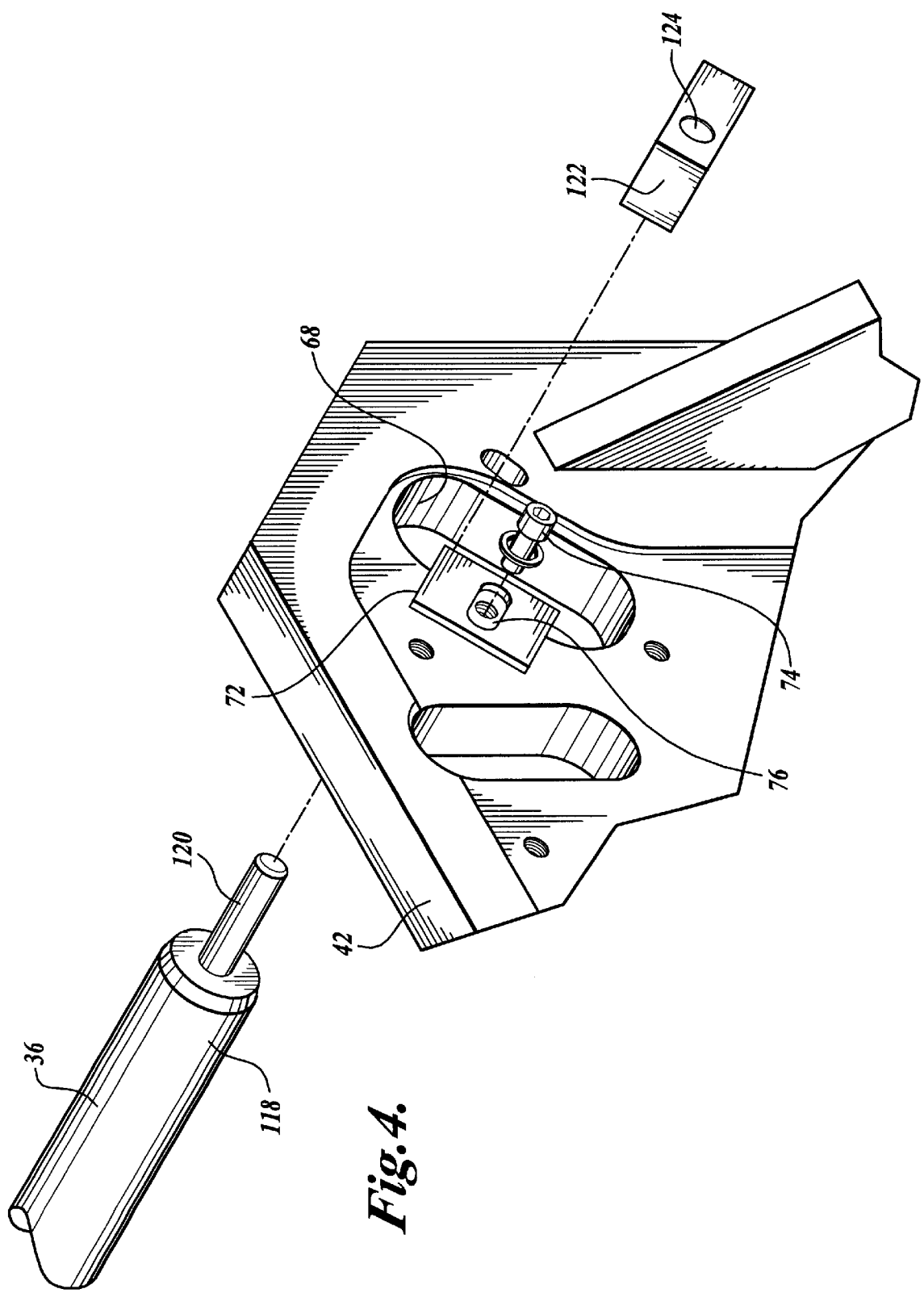
FIG. 4 illustrates a magnified view of a portion of the fixturing system shown in FIG. 3 utilizing a lifter bore spacer in accordance with aspects of the present invention.

FIG. 4 illustrates a spacer bracket 72, which is slideably attached to the mounting plate 42 adjacent to the second indexing slot 68 by a fastener, such as a screw 74. The spacer bracket 72 is rectangular in shape and includes a slot 76 that extends in a transverse direction with respect to the indexing slot 68. The screw 74 slideably attaches the spacer bracket 72 to the mounting plate 42 of the head stock assembly 30 via the slot 76. The slot 76 allows the spacer bracket 72 to move toward the middle of the indexing slot 68 to engage the larger diameter portion 118 after indexing member 36. Not only does the indexing member 36 provide a precise indexing position, the indexing member 36 also provides a rigid connection at the head stock assembly that minimizes movement and vibration in the engine block during the rebuilding process. As will be appreciated by those skilled in the art, the mounting plate may also include a spacer bracket identical in structure and operation adjacent to the indexing slot 70, as best shown in FIG. 3.

It will be appreciated to those skilled in the art that the inclined angle of the indexing slots 68 and 70 can be at 30 degrees or 45 degrees from the vertical axis to properly index 60 degree V-blocks and 90 degree V-blocks, respectively. Additionally, it is contemplated to be within the scope of the invention to include a head stock assembly 30 with indexing slots 68 and 70 at both 30 degrees and 45 degrees from the vertical axis. Further, it will be appreciated that the indexing slots 66, 68, and 70 may be elongated along the vertical axis, and the inclined axes, respectively, so that the fixturing system may accommodate engine blocks of various sizes.

Referring back to FIG. 3, the fixturing system 20 also comprises a tail stock assembly 32 adapted to clamp the end of the engine block B against the head stock assembly 30 during machining. The tail stock assembly 32 includes two spaced-apart vertical support members 80 secured to a base member 82 at right angles. The tail stock assembly 32 further includes a cylindrical mounting member 84 secured to the top of the support member 80, via any conventional fastening techniques, such as welding and the like. The cylindrical mounting member 84 includes a cylindrical body portion 86 and an annular push plate 88 secured to the engine block side of the cylindrical body portion 86 by fasteners 90. The outer surface of the push plate 88 that faces the head stock assembly forms a second clamping surface 91. The annular push plate 88 includes four threaded bores 92 evenly space around the outer peripheral surface thereof. Four screws are threaded into the bores 92 of the push plate 88. The function of the screws will be described below with reference to FIG. 7. The cylindrical mounting member 84 includes a bore 96 that extends longitudinally therethrough for receiving one end of the support member 34. The diameter of the bore 96 provides a sliding clearance fit so that the support member 34 is capable of passing through the bore 96. As will be appreciated by those skilled in the art, the allowance of the sliding clearance fit should be minimized to prevent excess radial movement.

The base member 82 of the tail stock assembly 32 includes a plurality of spaced-apart apertures 98 for attaching the tail stock assembly 32 to the tool table 22 (FIG. 2). To removably couple the tail stock assembly 32 to the tool table 22, two threaded fasteners, such as bolts 100, are passed through the apertures 98 and are received by two corresponding T-nuts 102 at the bottom of the base member 82. Handles 104 are secured to the top of the bolts 100 to provide an easy method for rotating the bolts 100. The T-nuts 102 are located such that they travel within the T-slots in the tool table 22 when the tail stock assembly 32 is positioned on the tool table 22. The base member 82 further includes two spaced-apart guide keys 106 secured to the bottom of the base member 82 in a longitudinal manner by fasteners, such as screws 108. The guide keys 106 are also properly positioned on the bottom surface of the base member 82 so that they may slide through the T-slots located in the tool table 22. In operation, the tail stock assembly 32 slides a desirable position on the tool table 22 and is secured to the tool table 22 by rotation of the handles 104, which tighten the T-nuts 100 against the inside surface of the T-slot.

Still referring to FIG. 3, the fixturing system 20 further comprises the support member 34 and the indexing member 36. The support member 34 is a cylindrical rod having a threaded end 110 and a semi-circular end 112, which is inserted into and routed through the main bearing crankshaft bore to properly align the engine block with the tool table 22 in the longitudinal direction. A hand wheel 114 is threaded over the threaded end 110 of the support member 34 and against the cylindrical mounting member 84 to rigidly secure the support member 34 to the tail stock assembly 32. The semi-circular end 112 of the support member 34 includes a flat surface 116 and an annular slot (not shown) spaced a distance proximal from the end of the support member 34. The annular slot receives the C-shaped end 64 of the clamping member 62 once the support member 34 is routed through the bore of the head stock assembly 30 to rigidly secure the support member 34 to the head stock assembly 30. The flat surface 116 at the end of the support member 34 is oriented in a downward position to rest on the support plate 58. The support plate 58 operates to inhibit rotation of the support member 34 due its engagement against the flat surface 116 thereof. Thus, when assembled, the bearing bar 34 properly aligns the engine block with the tool table in the longitudinal direction, and rigidly secures the engine block thereto.

It is well known in the art that engine blocks of different sizes have main bearing crankshaft bores of different diameters. To have the ability to rebuild different sizes of engine blocks, adapter blocks or sleeves (not shown) may be provided and can be secured over the support member 34 at locations corresponding to the main bearing caps of the engine block. The adapter blocks increase the diameter of the support member 34 at the main bearing cap locations to reduce the amount of space therebetween. In fact, the adapter blocks may be precisely designed for different sized engine blocks to provide a tight fit while still allowing the support member 34 to pass through the main bearing crankshaft bore 38.

Referring again to FIG. 3, the indexing member 36 is a cylindrical rod having a larger diameter portion 118 and a smaller diameter portion 120 formed at the end of larger diameter portion 118. The small diameter portion 120 of the indexing member 36 may be inserted into the cam bore of the engine block and is received by one of the indexing slots 66, 68, and 70 of the head stock assembly 30 to properly align the engine block for rebuilding. The indexing member 36 may continue to be inserted through the camshaft bore and into one of the indexing slots 66, 68, and 70 such that the large diameter portion extends through the selected slot 66, 68 or 70. The spacer bracket 72 may then translate to engage the larger diameter portion 118 of the indexing member 36 to rigidly secure one end of the indexing member to the head stock assembly, if inserted into either slot 68 or 70. The other end of the indexing member 36 is not rigidly connected to any portion of the fixturing system, as best shown in FIG. 2. Accordingly, the secure connection between the indexing member 36 and the head stock assembly 30 due to the engagement of spacer bracket aids in the prevention of any movement and vibration of the engine block.

The operation of the fixturing system 20 will now be described with reference to FIGS. 2 and 3. First, the user determines which engine surface will be refinished, and accordingly, positions and secures the head stock assembly 30 to a T-slotted tool table 22 of a selected finishing machine capable of refinishing the predetermined engine surface. For example, if the user wishes to refinish the cylinder bores, the user secures the head stock assembly to the working table of a reboring machine. The head stock assembly 30 is positioned on the tool table 22 by aligning the guide keys 52 and the T-nuts 50 with the T-slots of the tool table 22. The head stock assembly 30 is then moveable within the T-slots to proper align the engine block beneath the refinishing machine. The head stock assembly 30 is secured to the tool table 22 by fastening the bolts 48 thereby forcing the T-nuts 50 into clamping engagement with the top inside surface of the T-slots. The tail stock assembly 32 is then guided into position by aligning the guide keys 106 and T-nuts 102 with the T-slots of the tool table 22. The tail stock assembly 32 is temporarily positioned a distance apart from the head stock assembly 30 to allow an engine block B to be placed therebetween.

An engine block B to be rebuilt is then lowered between the head stock assembly 30 and the tail stock assembly 32 in an orientation corresponding to which engine surface is to be refinished. In this example, the engine block B is aligned longitudinal with the tool table 22 with the top of the engine block B facing upward. After the engine block B is lowered into position between the stock assemblies 30 and 32 the support member 34 is inserted, semi-circular end 112 first and flat surface 116 down, through the bore 96 of the cylindrical mounting member 84. The support member 34 is then routed through into the main bearing crankshaft bore and into the bore 56 of the head stock assembly 30. It will be appreciated by those skilled in the art that the main bearing caps are secured in place on the bottom of the engine block to form the crankshaft bore.

Once the support member 34 has passed through the bore 56 in the head stock assembly 30, the securement member 62 is lowered into engagement with the annular slot of the support member 34 to rigidly secure the support member 34 to the head stock assembly 30. The engine block B is then rotated about the axis of rotation of the support member in either direction depending on which surface of the engine is to be worked on. For example, the engine block B may be rotated clockwise to work on one bank of cylinders or rotated counterclockwise to work on the outer bank of cylinders. If the top of the engine block is to be checked, the engine may be rotated, if needed, to vertically align the top of the engine block.

After the engine block B is properly rotated, the indexing member 36 is inserted into and routed through the camshaft bore and received by either the indexing slot 68 or 70 of the head stock assembly 30, depending on which direction the engine block was rotated. The engine block may have to be rotated slightly to properly align the cam bore with the selected indexing slot. The spacer bracket 72 is then translated into engagement with the larger diameter portion 118 of the indexing member 36 and tightly secured via screw 74 in a fixed or stationary position. The tail stock assembly 32 is then translated toward the engine block to eliminate any gaps between the engine block and both stock assemblies 30 and 32, and secured into position on the tool table by rotating the handles 104. The engine block may have to be moved slightly to eliminate any gaps. At this point, the hand wheel 114 is threaded over the threaded end 110 of the support member 34 and rotated into engagement against the cylindrical mounting member 84 of the tail stock assembly 32 to rigidly secure the support member 34 to the tail stock assembly 32. Alternatively, the hand wheel 114 could be threaded over the support member 34 prior to insertion into the tail stock assembly 32. Then, once the engine block B is indexed to the proper position, the hand wheel 114 can be tightened against the cylindrical mounting member 84. In either case, the engine block B can then be rebuilt with accuracy and precision. It will be appreciated to those skilled in the art that the order of the steps described above can be varied to properly secure and align the engine block.

In another aspect of the present invention, the fixturing system 20 may be utilized to work on the lifter bore surfaces located within the engine block. As is known in the art, the central axes of the lifter bores are at an angle different than the central axes of the cylinder bores. Thus, to properly align or index the engine block so that the central axes of the lifter bores are vertically aligned, the fixturing system 20 requires another indexing point.

As best shown in FIG. 4, the fixturing system 20 further include a lifter bore spacer 122 that properly aligns the engine block to match engine lifter bore angles. The lifter bore spacer 122 is depicted to be inserted into slot 68 and secured by the spacer bracket 72. However, it will be appreciated that the lifter bore spacer 122 may be inserted in the other angled slot. The lifter bore spacer 122 includes a bore 124 having an axis offset from the cam bore axis for receiving the smaller diameter portion 120 of the indexing member 36. The amount of offset of the bore corresponds to the difference in angular rotation between the central axes of the cylinder bores and the axes of the lifter bores.

It will be appreciated by those skilled in the art that the location of the bore in the lifter bore spacer 122 changes with different size engine blocks. Therefore, different lifter bore spacers 122 having different bore locations may be fabricated and included for use with the fixturing system 20 to properly align different sized engine blocks during rebuilding.

Figure 5:
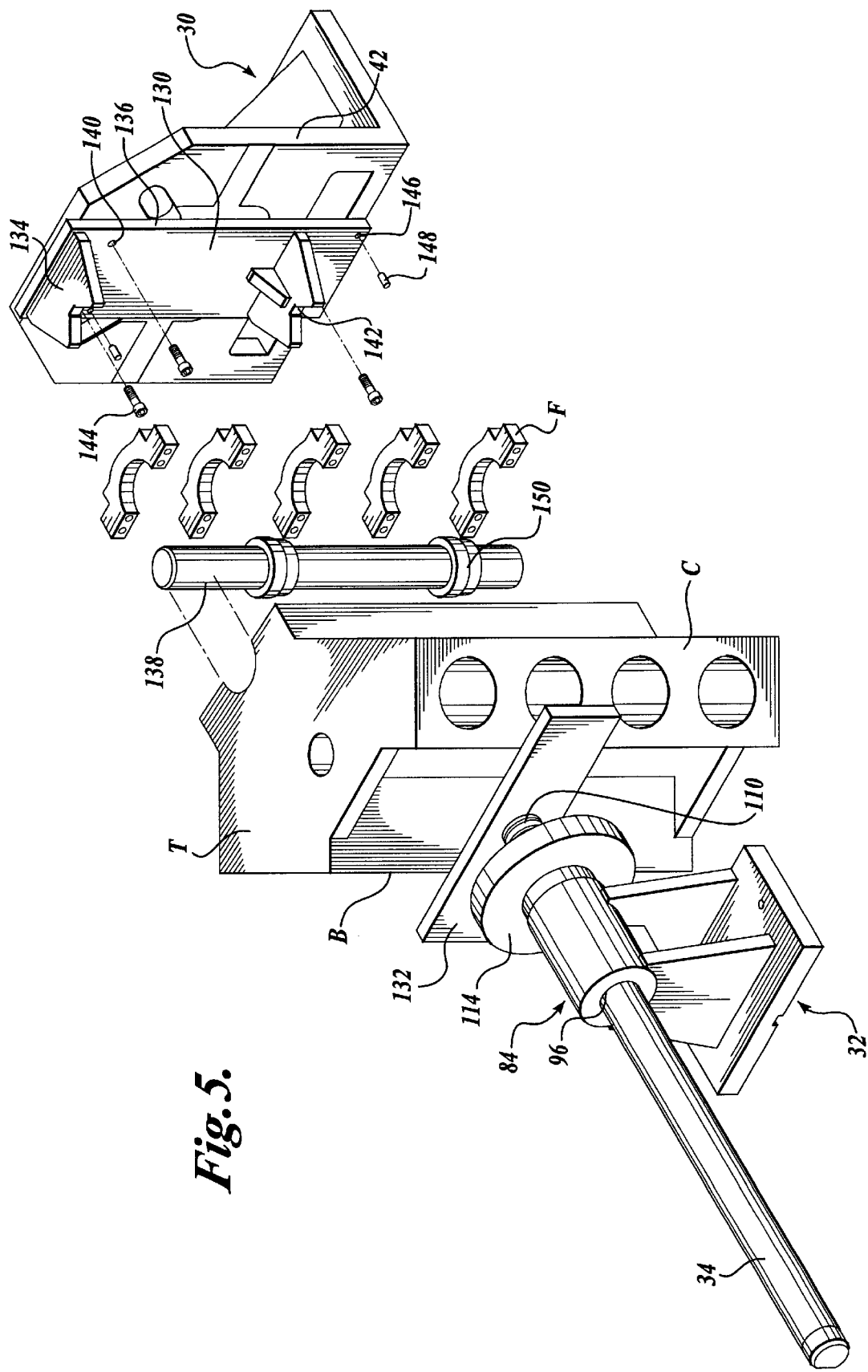
FIG. 5 illustrates an exploded view of the fixturing system utilized for aligning and securing an engine block to a working tool table in an upright position.

In still another aspect of the present invention, the fixturing system 20 may be utilized to properly align the engine block in an upright position where the engine block stands on end to precisely machine the engine block transmission flange T. As shown in FIG. 5, the fixturing system 20 may include a truing fixture 130 and a push plate 132 to properly clamp and align the engine block B between the stock assemblies 30 and 32 for machining. The truing fixture 130 is placed and secured against the inside surface of the head stock assembly 30. The push plate 132 is positioned between the engine block and the tail stock assembly 32 by the threaded end 110 of the support member 34 to hold the engine block securely between the tail stock assembly 32 and the head stock assembly 30. The push plate provides a larger clamping surface and protects the engine form being gouged by the support member.

As best shown in FIG. 5, the truing fixture 130 includes two spaced-apart V-shaped support members 134 secured at right angles to a vertical base member 136. V-shaped notches 142 that form the V-shaped support members 136 receive an alignment bar 138 in a vertical position to properly align the engine block along its vertical axis. The alignment bar 138 includes spacers 150 that engage against the main bearing grooves of the engine block. The truing fixture 130 further includes three spaced apart apertures 140 that align with apertures in the head stock assembly 30. The truing fixture 130 is secured to the head stock assembly 30 through the apertures 140 via removable fasteners, such as screws 144. The truing fixture 130 further includes two apertures 146 that align with apertures in the head stock assembly 30 for receiving dowel pins 148 to properly align the truing fixture 130 against the mounting plate 42 of the head stock assembly 30 orthogonal to the tool table, before being secured thereto with screws 144.

The operation of indexing the engine block so that the end surfaces of the block may be refinished will now be described with reference to FIG. 5. The headstock and tail stock assemblies 30 and 32 are positioned on the tool table as described with reference to FIG. 2. The truing fixture 130 is properly aligned via dowel pins 148 and is secured to the head stock assembly 30 by screws 144. The engine block B is then lowered onto the tool table in an upright position and placed against the truing fixture 130. The alignment bar 138 is placed between the truing fixture 130 and the engine block B as the engine block is positioned against the head stock assembly 30. Spacers 150 on the alignment bar 138 engage against the crankshaft bearing grooves while the portions of the alignment bar 138 disposed between the spacer 150 engage the V-shaped notches 142 in the truing fixture 130. If desired by the user, the main bearing caps F may be utilized to secure the alignment bar to the engine stock B.

The support member 34 is then passed through the bore of the cylindrical mounting member 84 threaded end 110 first. The tail stock assembly 32 is translated down the tool table to a position adjacent to the engine block B. The hand wheel 114 is then threaded onto the support member 34, and the support member 34 is pushed further through the bore 96 of the cylindrical mounted member 84 as the push plate 132 is placed against the cylinder bank C of the engine block B. The end of the support member 34 engages against the push plate 132 so that the push plate 132 is wedged between the engine block B and the end of the support member 34. The hand wheel 114 is then rotated in the direction necessary to cause the hand wheel 114 to come into engagement with the cylindrical mounting member 84. By tightening the hand wheel 114 against the cylindrical mounting member 84, the engine block B is securely positioned between the head stock assembly 30 and the tail stock assembly 32. The engine block B can then be inspected and/or machined without the possibility of small movements or vibration in the engine block. This provides precision machining of the selected surfaces of the engine block. As will be appreciated to those skilled in the art, the order of the steps described above can be varied to properly secure and align the engine block in an upright position.

Figure 6:
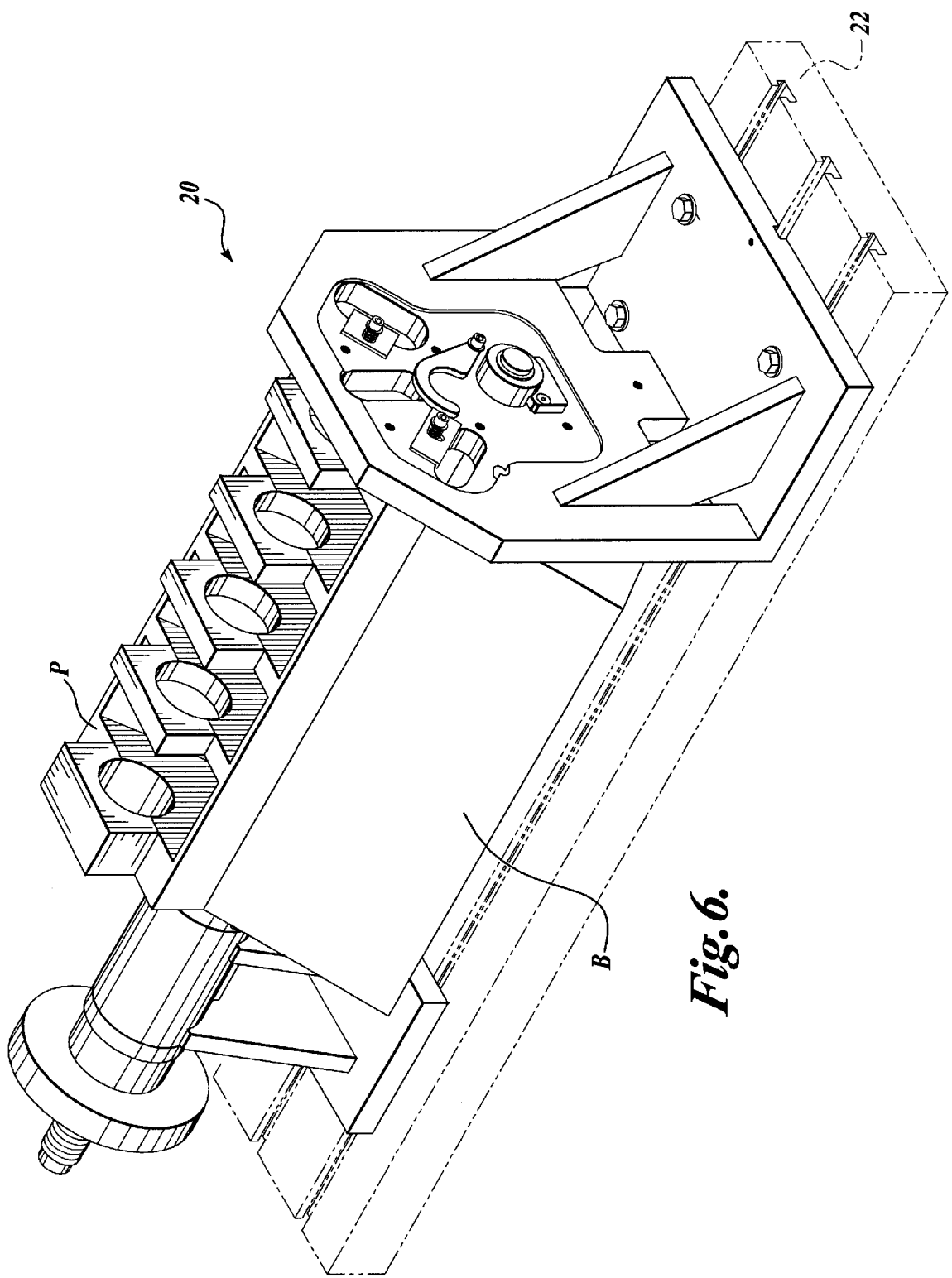
FIG. 6 illustrates a perspective of the fixturing system utilized for aligning and securing an engine block to a working tool table having the pan rails of the engine block facing up.
Figure 7:
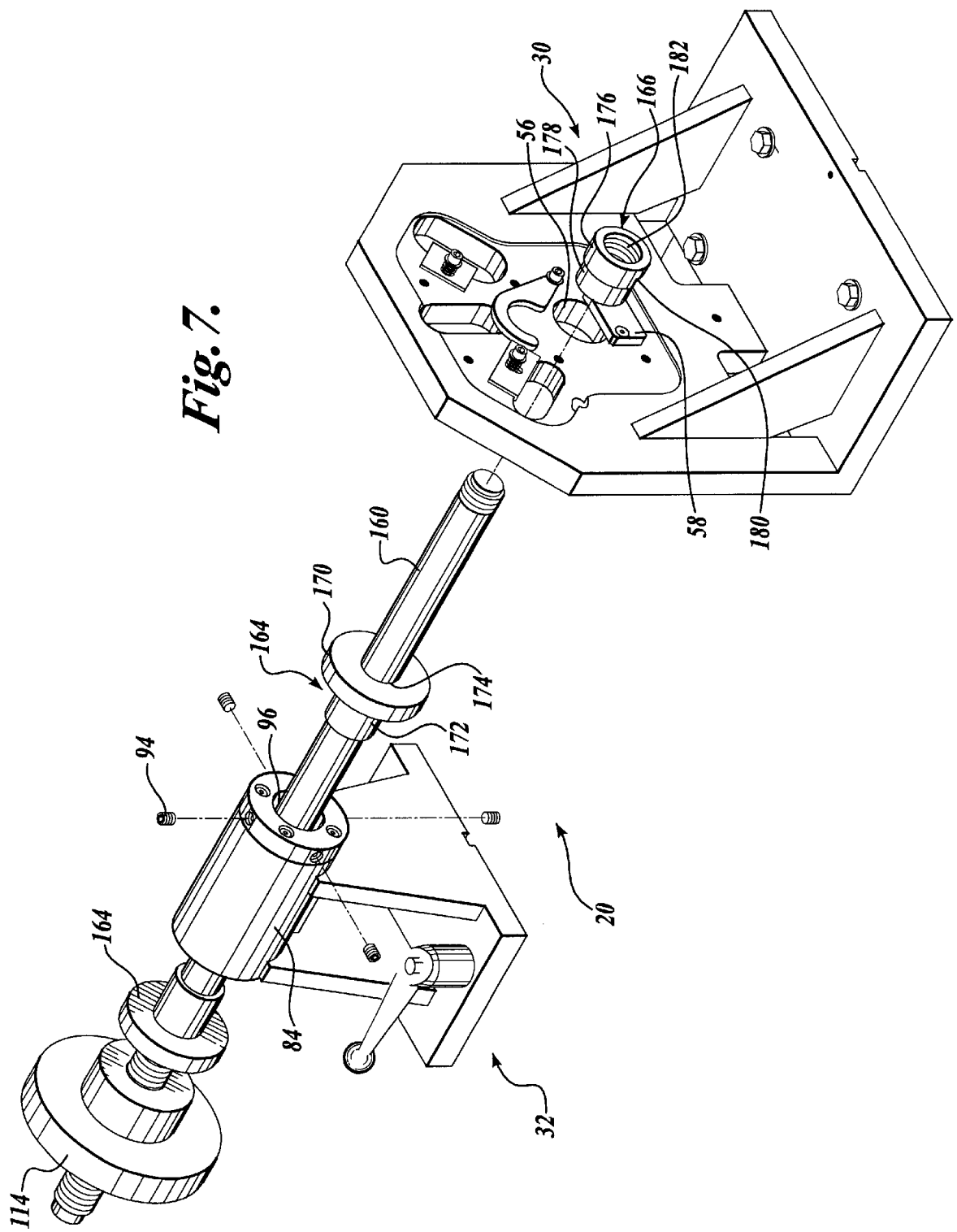
FIG. 7 illustrates an exploded view of the fixturing system shown in FIG. 6.

In still another aspect of the present invention shown in FIGS. 6 and 7, the fixturing system 20 as described above with reference to FIG. 2 may be utilized to secure and align the engine block B having its pan rails P parallel to the tool table 22 in an upward direction so that machining and/or inspecting can be done on the crankshaft bore and main bearing caps. It will be appreciated in this aspect that the support member 34 is not used in securing the engine block to the tool table 22. Further, it will be appreciated that the indexing member 36 is not used in its indexing function as described with respect to FIG. 2.

As shown in FIG. 7, a support member 160 is utilized with the fixturing system 20 to secure and align the engine block into a position with the pan rails facing upward. The support member 160 is an elongated rod that is threaded on both ends. Two tail stock bushings 164 and a head stock bushing 166 are included with the fixturing system 20 to properly center the support member 160 within the bore 96 of the cylindrical mounting member 84 and the bore 56 of the head stock assembly 30. The tail stock bushings 164 include a cylindrical body portion 170 and a cylindrical shoulder portion 172 having a smaller outer diameter than the body portion 170. The outer diameter of the shoulder portion 172 is slightly less than the diameter of the cylindrical mounting member 84 so that the tail stock bushings 164 can be inserted into the bore 96 at both ends of the cylindrical mounting member 84. The tail stock bushings 164 also include a bore 174 extending therethrough for receiving the support member 160. The annular push plate 88 of the cylindrical mounting member includes four threaded bores 92 evenly spaced around the outer peripheral surface thereof. Four screws 94 are threaded into the bores 92 of the push plate 88. The screws 94 provide an adjustment point so that the support member 160 can be moved slightly within the bore 96 of the cylindrical mounting member 84 to properly align the engine block between the stock assemblies 30 and 32.

The head stock bushing 166 includes a body portion 176 and a shoulder portion 178. Both portions are semi-circular in shape and have a flat bottom 180. The cross-section of the shoulder portion 178 corresponds to the shape of the centrally located bore 56 so that the head stock bushing 166 can be inserted therein and engage the support plate 58. The head stock bushing 166 includes a bore 182 having internal threads for receiving the threaded end of the support member 160.

The operation of the fixturing system 20 to secure and align the engine block with the pan rails facing upwardly, will now be described with reference to FIGS. 6 and 7. The head stock assembly 30 is positioned and secured to a T-slotted tool table 22 of a selected rebuilding machine. The tail stock assembly 32 is then guided into position on the tool table 22 and tail stock bushings 164 are inserted into the bore 96 of the cylindrical mounting member 84 at both ends. At approximately the same time, the head stock bushing 166 is inserted into the centrally located bore 56 of the head stock assembly 30. The tail stock assembly 32 is temporarily positioned a distance apart from the head stock assembly 30 to allow an engine block to be placed therebetween. An engine block B to be rebuilt is then lowered between the head stock assembly 30 and the tail stock assembly 32.

After the engine block B is lowered into position between the stock assemblies 30 and 32 having the pan rails facing upwardly from the working table, the support member 160 is inserted through the bores 174 of the tail stock bushing 160. The support member 160 is further routed through the camshaft bore and threaded into the bore 182 of the head stock bushing 166 to rigidly secure the support member 160 to the head stock assembly 30. The tail stock assembly 32 is then translated toward the engine block B to eliminate any gaps between the engine block and both stock assemblies 30 and 32 and secured into position on the tool table by rotation of the handles 104. The engine block B may have to be moved slightly to eliminate any gaps. At this point, the hand wheel 114 is threaded over the end of the support member 160 and rotated into engagement against the cylindrical mounting member 84 of the tail stock assembly 32 to rigidly secure the support member 160 to the tail stock assembly 32. The engine block B can then be rebuilt with accuracy and precision. It will be appreciated by those skilled in the art that the order of the steps described above can be varied to properly secure and align the engine block.

In still yet another aspect of the present invention, the fixturing system 20 may be utilized to properly align and secure an overhead cam engine block OHCB to a tool table so that machining and/or inspection of the engine block can be preformed. For overhead cam engines, the configuration of the fixturing system 20 described with reference to FIG. 2 is utilized to align and secure the engine block to the tool table 22 to be machined. However, as is well know in the art, an overhead cam engine block does not contain a cam bore through the engine block. Therefore, a sliding wedge device 200 is utilized with the fixturing system 20 as the indexing member to properly align and "index" the overhead cam engine block to be machined.

Figure 8:
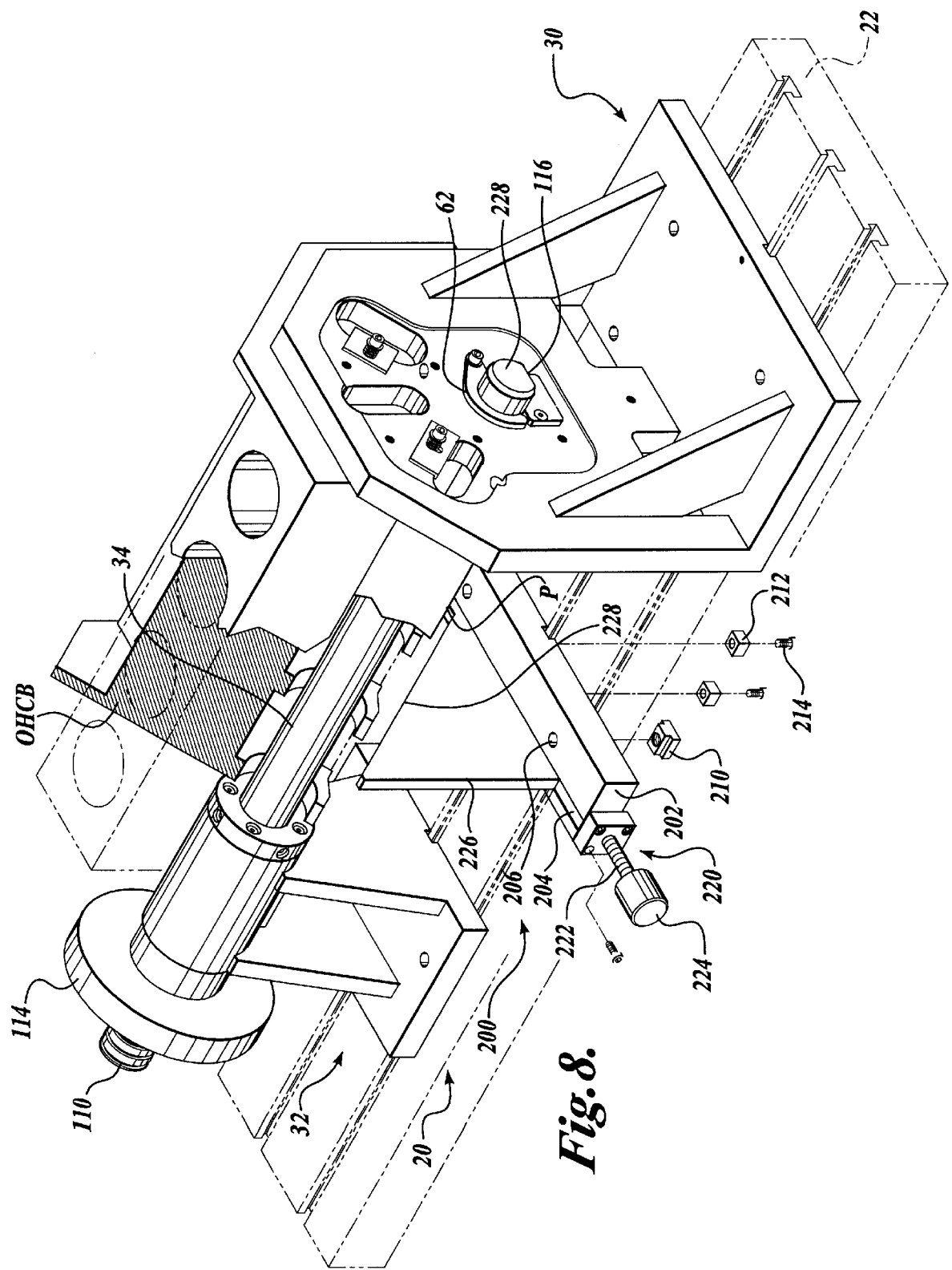
FIG. 8 illustrates a perspective view of the fixturing system utilized for aligning and securing an overhead cam engine block to a working tool table.

As shown in FIG. 8, the sliding wedge device 200 is positioned upon the tool table between the head stock assembly 30 and the tail stock assembly 32. The sliding wedge device 200 includes a base member 202 having a slot 204. The slot 204 extends in a direction that is transverse with respect to the T-slots in the tool table when the sliding device is installed. The base member 202 includes a plurality of spaced-apart apertures 206 for attaching the sliding wedge device 200 to the tool table. To removably couple the sliding wedge device 200 to the tool table, two fasteners (not shown) such as bolts are passed through the apertures 206 and are received by two corresponding T-nuts 210 at the bottom of the base member 202. The T-nuts 210 are located such that they travel within the T-slots in the tool table while the sliding wedge device 200 is positioned on the tool table 22. The base member 202 further includes two spaced-apart guide keys 212 secured to the bottom thereof by fasteners such as screws 214. The guide keys 212 are also properly position on the bottom surface of the base member 202 so that they may slide through the T-slots located in the T-slotted machine tool table. The sliding wedge device 200 slides into a desirable position on the tool table 22 and is secured to the tool table 22 by the T-nuts 210.

Disposed within the slot 204 and secured at both ends of the base member 202 is a linear screw mechanism 220. The linear screw mechanism 220 includes a lead screw 222 rotatably coupled to the base member 202 and a nut (not shown) that is in threaded engagement with the lead screw 222. A hand knob 224 is fixed at the end of the lead screw 222 so that the lead screw can be rotated by hand. Attached to the top surface of the nut is a wedge plate 226. The wedge plate 226 is triangular in shape with the hypotenuse 228 of the wedge plate 226 facing toward the center of the tool table 22. The hypotenuse 228 of the wedge plate 226 supports the pan rails P (bottom surface) of the overhead cam engine block OHCB and properly aligns and indexes the engine block such that the central axes of the cylinder bores are vertical aligned.

It will be appreciated that the angle of the hypotenuse 228 determines whether or not the overhead cam engine block is properly aligned. For example, to properly align a 90-degree V-block, the hypotenuse angle is inclined from the vertical axis by 45 degrees. To properly align a 60-degree V-block, the hypotenuse 228 angle is inclined from the vertical axis by 30 degrees.

The operation of the fixturing system 20 utilized to align and secure an overhead cam engine block to a tool table will now be described with reference to FIG. 8. After properly positioning and securing the head stock assembly 30 to the tool table 22 of the selected rebuilding machine, the sliding wedge device 200 is guided down the tool table via the T-nuts 210 and guide keys 212. The tail stock assembly 32 is then guided into position on the tool table 22. The tail stock assembly 32 is temporarily positioned a distance apart from the head stock assembly 30 to allow an overhead cam engine block to be placed therebetween. The sliding wedge device 200 is then positioned approximately midway between the stock assemblies and secured to the tool table 22 via the t-nuts 212. The wedge plate 226 is translated away from the middle of the tool table 22 so as to receive the overhead cam engine block OHCB. An overhead cam engine block OHCB to be rebuilt is then lowered in the proper orientation between the head stock assembly 30 and the tail stock assembly 32.

After the overhead cam engine block OHCB is lowered into position between the stock assemblies 30 and 32, the support member 34 is inserted and secured as described above with reference to FIGS. 2 and 3. The overhead cam engine block OHCB is then rotated to vertically align the bank of cylinders to be worked on. While the overhead cam engine block OHCB is rotated, the wedge plate 226 is translated into engagement with the pan rails P of the engine block by rotating the lead screw 222 via the hand knob 224. This properly aligns and indexes the bank of cylinders in the vertical position. The tail stock assembly 32 is then translated toward the overhead cam engine block OHCB to eliminate any gaps between the engine block and both stock assemblies 30 and 32 and secured into position on the tool table by rotation of the handles 104. The engine block may have to be moved slightly to eliminate the gaps. At this point, the hand wheel 114 is threaded over the threaded end 110 of the support member 34 and rotated into engagement against the cylindrical mounting member 84 of the tail stock assembly 32 to rigidly secure the support member 34 to the tail stock assembly 32. The overhead cam engine block OHCB can then be rebuilt with accuracy and precision. It will be appreciated to those skilled in the art that the order of the steps described above can be varied to properly secure and align the overhead cam engine block OHCB.

Figure 9:
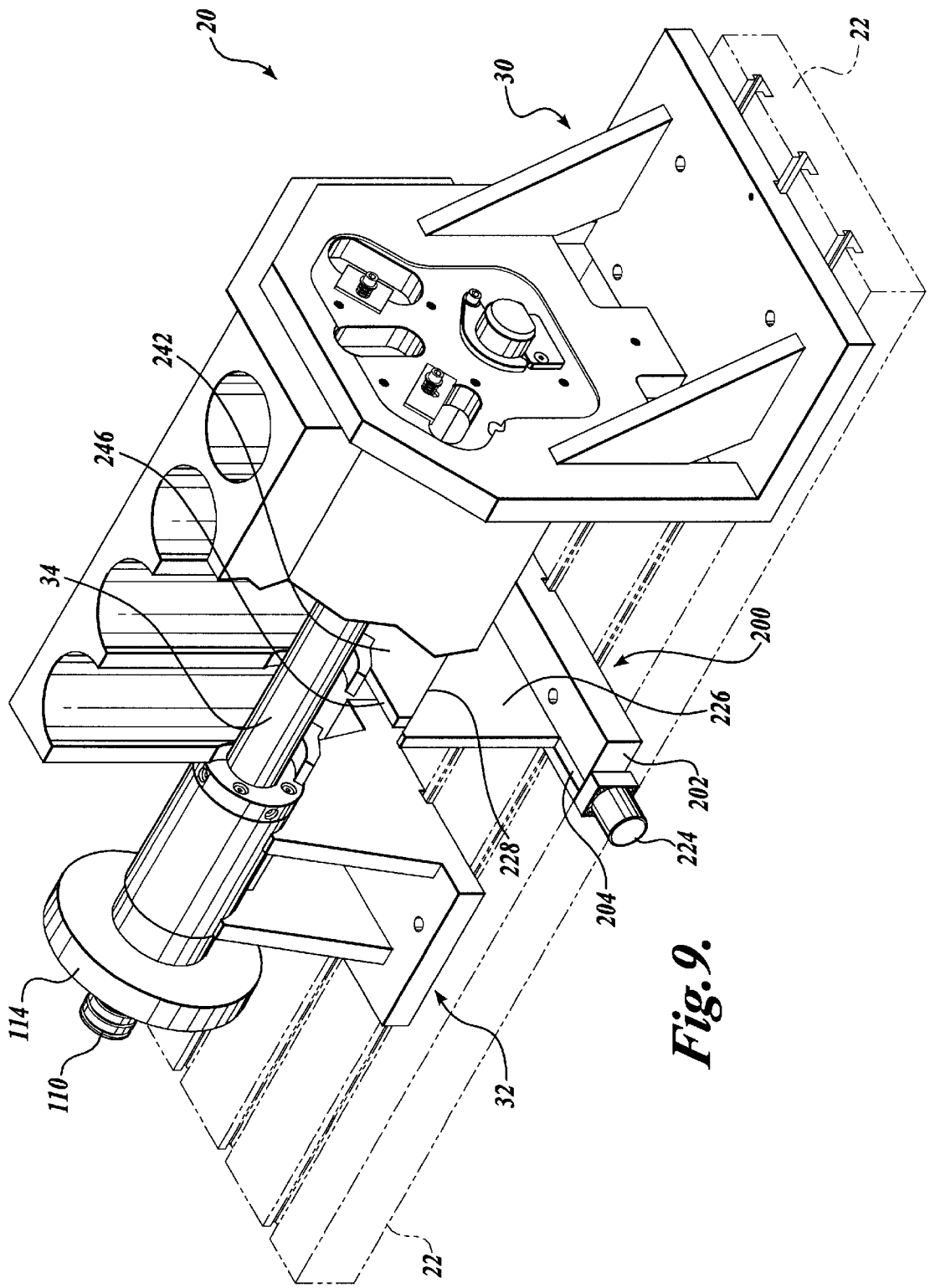
FIG. 9 illustrates a perspective view of the fixturing system utilized for aligning and securing an inline cylinder engine block to a working tool table.

In still yet another aspect of the present invention, the fixturing system 20 may be utilized to properly align and secure an inline cylinder engine block so that machining and/or inspection can be preformed. For inline cylinder engine blocks, the configuration of the fixturing system 20 described above with reference to FIG. 8 is utilized to align and secure the engine block to the tool table 22 to be machined. However, as is well know in the art, an inline cylinder engine block does not contain a cam bore located above the crankshaft bore that can be used to index the engine block for rebuilding. Therefore, two sliding wedge devices are utilized with the fixturing system 20 to properly align or "index" the overhead cam engine block to be machined. As shown in FIG. 9, the first sliding wedge device 200 is positioned upon the tool table 22 between the head stock assembly 30 and the tail stock assembly 32. As described above with reference to FIG. 8, the sliding wedge device 200 includes a horizontally oriented base member 202 having a slot or groove 204 that extends in a direction that is transverse with respect to the T-slots in the tool table 22. The base member 202 includes a plurality of spaced-apart apertures 206 for attaching the sliding wedge device 200 to the tool table. Disposed within the slot 204 and secured at both ends of the base member 202 is a linear screw mechanism 220. The linear screw mechanism 220 includes a lead screw 222 (FIG. 8) rotatably coupled to the base member 202 and a nut (not shown) that is in threaded engagement with the lead screw 222. A hand knob 224 is fixed at the end of the lead screw 222 so that the lead screw can be rotated by hand. Attached to the top surface of the nut is a wedge plate 226. The wedge plate 226 is triangular in shape with the hypotenuse 228 of the wedge plate 226 facing toward the center of the tool table 22.

Figure 10:
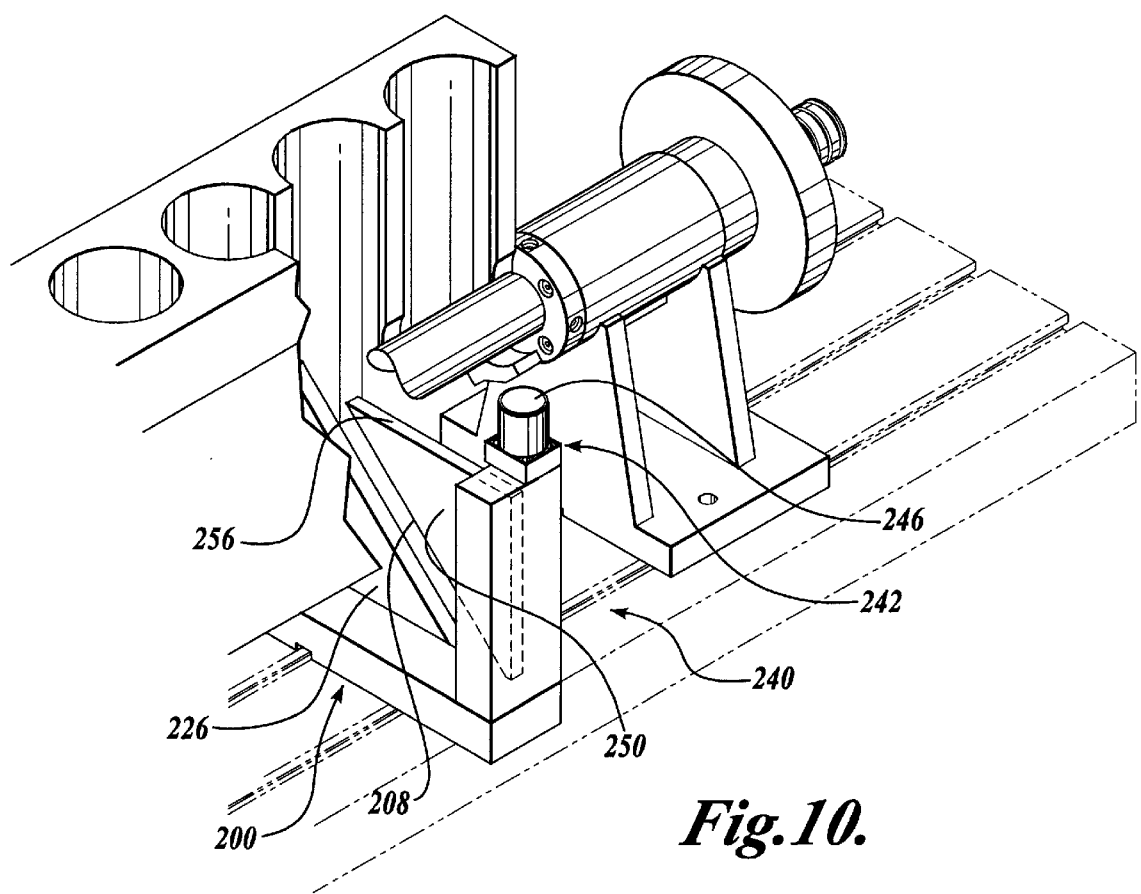
FIG. 10 illustrates a perspective of the fixturing system of FIG. 9, taken from the opposite side of FIG. 9.

As shown in FIG. 10, the second sliding wedge device 240 is used in conjunction with the first sliding wedge device 200 to provide a horizontal support surface to engage the pan rails of the inline cylinder engine block. The vertically oriented second sliding wedge device 240 is removably coupled to the first sliding wedge device 200 at a right angle via removable fasteners or a pin and slot connection, which are not shown but are well known in the art. The sliding wedge device 240 includes a linear screw mechanism 242 disposed within a slot (not shown) therein. The linear screw mechanism 242 includes a vertically oriented lead screw (not shown), a nut (not shown) threaded onto the lead screw, and a hand knob 240 secured to the end of the lead screw. A wedge plate 250, triangular in shape, is secured to the nut of the second linear screw mechanism 242. The hypotenuse 252 of the wedge plate 250 is adapted to engage with the hypotenuse 228 of the first wedge plate 226 to provide a horizontal support surface 256. The horizontal support surface 256 can be raised and lowered to support the pan rails of different sized inline cylinder engine blocks by vertical translation of the nut of the second linear screw mechanism 242 and horizontal translation of the nut of the first linear screw mechanism.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A fixturing system for affixing an engine block having rebuildable surfaces to a working table having a longitudinal axis, comprising:
   a first clamping member adapted to be fixedly mounted to the working table, the first clamping member having a clamping surface substantially orthogonal to the top surface of the working table for clamping a first surface of an engine block;
   a second clamping member adapted to be fixedly mounted to the working table a remote distance from the first clamping member, the second clamping member having a clamping surface substantially orthogonal to the top surface of the working table for clamping a second surface of the engine block; and
   a support member operable to align the engine block substantially parallel to the longitudinal axis of the working table, the support member being routed through the engine block and fixedly connected to the first and second clamping members to eliminate relative movement between the fixturing system and the engine block when the engine block is clamped therebetween;
   wherein the support member is an elongate rod adapted to be routed through a camshaft bore of the engine block, the support member fixedly connected to the respective first and second clamping members at opposing ends of the support member.

2. The fixturing system of claim 1, further including an indexing member operably associated with the first or second clamping member for indexing the engine block between the first and second clamping members such that a pre-selected rebuildable surface of the engine is properly aligned with a rebuilding machine associated with the working table.

3. The fixturing system of claim 2, wherein the pre-selected rebuildable surface of the engine is vertically aligned with a rebuilding machine associated with the working table.

4. A fixturing system for affixing an engine block having rebuildable surfaces to a working table having a longitudinal axis, comprising:
   a first clamping member adapted to be fixedly mounted to the working table, the first clamping member having a clamping surface substantially orthogonal to the top surface of the working table for clamping a first surface of an engine block;
   a second clamping member adapted to be fixedly mounted to the working table a remote distance from the first clamping member, the second clamping member having a clamping surface substantially orthogonal to the top surface of the working table for clamping a second surface of the engine block;
   a support member operable to align the engine block substantially parallel to the longitudinal axis of the working table, the support member being routed through the engine block and fixedly connected to the first and second clamping members to eliminate relative movement between the fixturing system and the engine block when the engine block is clamped therebetween; and
   an indexing member operably associated with the first or second clamping member for indexing the engine block between the first and second clamping members such that a pre-selected rebuildable surface of the engine is properly aligned with a rebuilding machine associated with the working table, wherein the indexing member is an elongate rod adapted to be routed through a camshaft bore of the engine block.

5. The fixturing system of claim 4, wherein the first clamping member includes a first indexing slot adapted to receive the end of the indexing member, the longitudinal axis of the first indexing slot forming an acute angle with a vertical axis of the first clamping member that bisects the first clamping member.

6. The fixturing system of claim 5, wherein the first clamping member includes a second indexing slot adapted to receive the end of the indexing member, the longitudinal axis of the second slot forming an acute angle with the vertical axis that bisects the first clamping member, wherein the second slot is disposed on the side opposite that of the first slot.

7. The fixturing system of claim 6, wherein the end of the elongate rod is fixedly connected to the first clamping member.

8. The fixturing system of claim 7, wherein the first clamping member includes engagement brackets slideably connected adjacent to the first and second slots, the engagement brackets operable to fixedly connect the end of the rod to the first clamping member.

9. The fixturing system of claim 6, wherein the fixturing system further includes a lifter bore spacer adapted to be received by the first or second slots, the lifter bore spacer operable to properly align the engine block so that the lifter bores of the engine are vertically aligned.

10. The fixturing system of claim 4, wherein the first clamping member includes first indexing slot adapted to receive the end of the indexing member, the longitudinal axis of the first slot being coaxial with the vertical axis that bisects the first clamping member.

11. A fixturing system for affixing an engine block having rebuildable surfaces to a working table having a longitudinal axis, comprising:

a first clamping member adapted to be fixedly mounted to the working table, the first clamping member having a clamping surface substantially orthogonal to the top surface of the working table for clamping a first surface of an engine block;

a second clamping member adapted to be fixedly mounted to the working table a remote distance from the first clamping member, the second clamping member having a clamping surface substantially orthogonal to the top surface of the working table for clamping a second surface of the engine block;

a support member operable to align the engine block substantially parallel to the longitudinal axis of the working table, the support member being routed through the engine block and fixedly connected to the first and second clamping members to eliminate relative movement between the fixturing system and the engine block when the engine block is clamped therebetween; and an indexing member operably associated with the first or second clamping member for indexing the engine block between the first and second clamping members such that a pre-selected rebuildable surface of the engine is properly aligned with a rebuilding machine associated with the working table, wherein the indexing member is a first sliding wedge device adapted to be positioned on the tool table between the first and second clamping members, the first sliding wedge device including a base member disposed parallel with the top surface of the working table and a support plate operably connected to the base member and having an inclined support surface.

12. The fixturing system of claim 11, wherein the inclined support surface engages the bottom surface of the engine block to vertically align the pre-selected rebuildable surface of the engine block.

13. The fixturing system of claim 11, wherein the indexing member further includes a second sliding wedge device connected to the first sliding wedge device between the first and second clamping members, the second sliding wedge device including a base member disposed orthogonal to the top surface of the working table and a support plate operably connected to the base member and having an inclined engagement surface which engages the inclined engagement surface of the second support plate.

14. The fixturing system of claim 13, wherein the second support plate has a support surface parallel with the top surface of the working table, the support surface of the second support plate engages the bottom surface of the engine block to vertically align the pre-selected rebuildable surface of the engine block.

15. The fixturing system of claim 1, wherein the first clamping member includes a bore adapted to receive one end of the elongate rod, and wherein the second clamping member includes a bore adapted to receive the other end of the elongate rod.

16. The fixturing system of claim 15, wherein the fixturing system further includes a first bushing inserted into the bore of the first clamping member, and a second busing inserted into the bore of the second clamping member, wherein the first and second bushings are operable to align the elongate member with respect to the first and second clamping members.

17. A fixturing system for affixing an engine block having rebuildable surfaces to a working table having a longitudinal axis, comprising:

a first clamping member adapted to be fixedly mounted to the working table, the first clamping member having a clamping surface substantially orthogonal to the top surface of the working table for clamping a first surface of an engine block;

a second clamping member adapted to be fixedly mounted to the working table a remote distance from the first clamping member, the second clamping member having a clamping surface substantially orthogonal to the top surface of the working table for clamping a second surface of the engine block; and a support member operable to align the engine block substantially parallel to the longitudinal axis of the working table, the support member being routed through the engine block and fixedly connected to the first and second clamping members to eliminate relative movement between the fixturing system and the engine block when the engine block is clamped therebetween; wherein the support member is a elongate rod adapted to be routed through a crankshaft bore of the engine block, the elongate rod fixedly connected to the respective first and second clamping members at the opposing ends of the elongate rod; and wherein the first clamping member includes a bore adapted to receive one end of the elongate rod, and wherein the second clamping member includes a bore adapted to receive the other end of the elongate rod.

18. A fixturing system for affixing an engine block having rebuildable surfaces to a working table having a longitudinal axis, comprising:

a first clamping member adapted to be slidably mounted to the working table along a longitudinal path of travel of the working table, the first clamping member being selectively positionable in an unsecured position, wherein the first clamping member is operable to translate along the longitudinal path of travel, and selectively positionable in a secured position, wherein the first clamping member is fixedly secured at a desired position along the longitudinal path of travel, the first clamping member having a first clamping surface substantially orthogonal to the top surface of the working table;

a second clamping member adapted to be slidably mounted to the working table along a longitudinal path of travel of the working table a remote distance from the first clamping member, the second clamping member being selectively positionable in an unsecured position, wherein the second clamping member is operable to translate along the longitudinal path of travel, and selectively positionable in a secured position, wherein the second clamping member is fixedly secured at a desired position along the longitudinal path of travel, the second clamping member having a second clamping surface substantially orthogonal to the top surface of the working table; and a support member operable to align the engine block substantially parallel to the longitudinal axis of the working table, the support member being routed through the engine block and fixedly connected to the first and second clamping members to eliminate relative movement between the fixturing system and the engine block when the engine block is clamped therebetween, wherein the support member is an elongate rod adapted to be routed through a crankshaft bore of the engine block, the elongate rod fixedly connected to the respective first and second clamping members at the opposing ends of the elongate rod; and wherein the first clamping member includes a bore adapted to receive a first end of the elongate rod, and wherein the second clamping member includes a bore adapted to receive a second end of the elongate rod.

19. The fixturing system of claim 18, further including an indexing member operably associated with the first or second clamping members for indexing the engine block between the first and second clamping members such that a pre-selected rebuildable surface of the engine is properly aligned with a rebuilding machine associated with the working table.

20. The fixturing system of claim 18, wherein the first clamping member includes a securement member pivotally connected to the first clamping member adjacent to the first clamping member bore, the secured member operable to fixedly connect the end of the elongate member to the first clamping member.

21. The fixturing system of claim 20, wherein the securement member is selectively positionable in a disengaged position, wherein the end of the elongate member is movably connected to the first clamping member, and selectively positionable in an engaged position, wherein the end of the elongate member is fixedly connected to the first clamping member.

22. The fixturing system of claim 18, wherein the second clamping member includes a securement member having an internal threaded surface, and wherein the second end of the elongate rod has a threaded surface, the internal threaded surface of the securement member threadably engageable with the threaded surface of the elongate rod so as fixedly connect the second end of the elongate member to the second clamping member.

23. A fixturing system for affixing an engine block having rebuildable surfaces to a working table, comprising:

a first clamping member adapted to be fixedly mounted to the working table, the first clamping member having a first surface substantially orthogonal to the top surface of the working table;

a second clamping member adapted to be fixedly mounted to the working table a remote distance from the first clamping member;

a truing member having spaced-apart notches, the alignment member being secured to the first surface of the first clamping member such that the notches are orthogonal to the top surface of the working table;

an alignment bar adapted to be engaged by the main bearing grooves of the engine block, the alignment bar operable to engage the alignment notches such that the alignment bar is orthogonal to the top surface of the working table; and an elongate rod selectively secured to the second clamping member, one end of the elongate rod is adapted to engage against the engine block to clamp the engine block between the first clamping member and the end of the elongate rod.

24. The fixturing system of claim 23, wherein the second clamping member has a bore adapted to receive the elongate rod.

25. The fixturing system of claim 24, wherein the second clamping member includes a securement member having an internal threaded surface, and wherein the end of the elongate rod has a threaded surface, the internal threaded surface of the securement member threadably engageable with the threaded surface of the elongate rod so as to fixedly connect the end of the elongate member to the second clamping member.

26. A method of fixturing an engine block having rebuildable surfaces to a working table, the working table operably coupled to a rebuilding machine, the method comprising:

securing a first clamping member to the working table, the first clamping member having a first clamping surface;

positioning a second clamping member having a second clamping surface to the working table a spaced-apart distance from the first clamping member, the spaced apart-distance capable of receiving an engine block therebetween;

positioning an engine block between the first and second clamping surfaces of the first and second clamping members;

aligning the engine block between the first and second clamping members with a support member by routing the support member through the engine block;

securing the ends of the support member to the first and second clamping members;

clamping the engine block between the first and second clamping surfaces;

indexing the engine block with a sliding wedge device so that a pre-selected engine surface is vertically aligned with the rebuilding machine; wherein indexing the engine block includes:

positioning the sliding wedge device so that an inclined support surface of the sliding wedge device supports the bottom surface of the engine block to properly align a pre-selected engine surface.

27. The method of claim 26, wherein aligning the engine block between the first and second clamping members with a support member includes:

routing the support member through the crankshaft bore of the engine block.

28. The method of claim 26, wherein securing a first clamping member includes:

selectively adjusting the first clamping member to a selected position of the working table; and fixedly securing the first-clamping member to the working table at the selected position.

29. The method of claim 26, wherein positioning an engine block between the first and second clamping surfaces of the first and second clamping members includes:

positioning the engine block between the first and second clamping members in an orientation that corresponds to a preselected engine surface.

30. The method of claim 26, wherein clamping the engine block between the first and second clamping surfaces includes:

moving the second clamping member so that the second clamping member is adjacent to the engine block and the second clamping surface abuts against the engine block; and securing the second clamping member to the working table.

31. A method of fixturing an engine block having rebuildable surfaces to a working table, the working table operable coupled to a rebuilding machine, the method comprising:

securing a first clamping member to the working table, the first clamping member having a first surface;

securing a truing member to the first surface of the first clamping member in a removable fashion, the truing member having vertically aligned spaced-apart notches;

positioning a second clamping member to the working table a spaced-apart distance from the first clamping member, the spaced apart-distance capable of receiving an engine block therebetween;

positioning an engine block having a longitudinal axis between the first and second clamping members such that the longitudinal axis of the engine block is substantially orthogonal to the top surface of the working table;

aligning the engine block between the first and second clamping members with an alignment bar, the alignment bar positioned between the spaced-apart notches of the truing member and the main bearing grooves of the engine block; and clamping the engine block between the first and second clamping members.

32. The method of claim 31, wherein clamping the engine block between the first and second clamping members includes:

routing an elongate bar through a bore of the second clamping member, the end of the elongate bar having a threaded surface;

rotating a securement member having an internal threaded surface onto the threaded surface of the elongate bar after the elongate bar passes through the bore;

engaging the end of the elongate bar against the engine block; and tightening the securement member against the second clamping member by rotation of the securement member.

33. The method of claim 32, wherein engaging the end of the elongate bar against the engine block includes:

positioning a plate between the engine block and the end of the elongate bar.

34. A fixturing system for affixing an engine block having rebuildable surfaces to a working table having a longitudinal axis, comprising:

a first support structure adapted to be fixedly mounted to the working table, the first support structure having a first support surface substantially orthogonal to the top surface of the working table for supporting a first surface of an engine block;

a second support structure adapted to be fixedly mounted to the working table, the second support structure having a second support surface substantially orthogonal to the top surface of the working table for supporting a second surface of an engine block; and an indexing member associated with the first or second support structure for indexing the engine block between the first and second support structures such that a pre-selected rebuildable surface of the engine block is properly aligned with a rebuilding machine associated with the working table.

35. A head stock assembly of a fixturing system utilized for affixing an engine block having rebuildable surfaces to a working table having a longitudinal axis, the head stock assembly comprising:

a base adapted to be fixedly mounted to the working table;

a mounting member connected to the base, the mounting member having a support surface substantially orthogonal to the top surface of the working table for supporting a surface of an engine block, wherein the mounting member includes an opening suitably located for receiving one end of a support member and a plurality of space-apart indexing slots suitably positioned for receiving one end of an indexing member.

36. The assembly of claim 35, wherein a first indexing slot of the plurality of indexing slots is disposed above the opening and shares a common bisecting axis with the opening.

37. The assembly of claim 36, wherein a second indexing slot of the plurality of indexing slots is disposed to one side of the first indexing slot such that the longitudinal axis of the second indexing slot forms an acute angle with the common bisecting axis.

38. The assembly of claim 36, wherein a first indexing slot of the plurality of indexing slots is disposed above and to one side of the opening such that the intersection of the longitudinal axis of the first indexing slot and the vertical bisecting axis of the opening forms an acute angle.

* * * * *

UNITED STATES PATENT AND TRADEMARK OFFICE
CERTIFICATE OF CORRECTION

PATENT NO.     : 6,619,645 B1
DATED          : September 16, 2003
INVENTOR(S)    : A.C. Rottler et al.

It is certified that error appears in the above-identified patent and that said Letters Patent is hereby corrected as shown below:

Title page,
Item [57], ABSTRACT,
Line 4, "rebuilding process." should read -- the rebuilding process. --
Line 7, "assembly, tail stock" should read -- assembly, a tail stock --

Column 15,
Lines 61-62, "ther-
           ebetween;" should break -- there-
           between; --
Line 62, "ebetween;" should read -- ebetween; and --

Column 16,
Lines 32-33, "ther-
           ebetween;" should break -- there-
           between; --
Line 59, "slideably" should read -- slidably --

Column 17,
Line 2, "includes first indexing" should read -- includes a first indexing --
Lines 26-27, "ther-
           ebetween;" should break -- there-
           between; --
Line 57, "plate engages;" should read -- plate engaging --
Line 67, "busing" should read -- bushing --

Column 18,
Lines 25-26, "ther-
           ebetween;" should break -- there-
           between; --
Line 26, "a elongate" should read -- an elongate --

Column 19,
Line 38, "so as fixedly" should read -- so as to fixedly --

Column 20,
Lines 17-18, "spaced apart-distance" should read -- spaced-apart distance --
Line 29, "clamping surfaces;" should read -- clamping surfaces; and --
Line 48, "first-clamping" should read -- first clamping --

UNITED STATES PATENT AND TRADEMARK OFFICE
CERTIFICATE OF CORRECTION

PATENT NO. : 6,619,645 B1
DATED : September 16, 2003
INVENTOR(S) : A.C. Rottler et al.

It is certified that error appears in the above-identified patent and that said Letters Patent is hereby corrected as shown below:

Column 21,
Line 9, "spaced apart-distance" should read -- spaced-apart distance --

Column 22,
Line 21, "working table;" should read -- working table; and --
Line 28, "space-apart" should read -- spaced-apart --

Signed and Sealed this

Second Day of March, 2004

JON W. DUDAS
*Acting Director of the United States Patent and Trademark Office*